3,251,849
CERTAIN ETHER PICOLINIC ACID COMPOUNDS
Mary S. Tomita, Glendale, Calif., assignor to The Dow Chemical Corporation, Midland, Mich., a corporation of Delaware
No Drawing. Filed Apr. 9, 1964, Ser. No. 358,615
7 Claims. (Cl. 260—295)

The present invention is concerned with certain ether picolinic acid compounds, particularly, ethers and thioethers of polychloropicolinic acids and esters having the formula

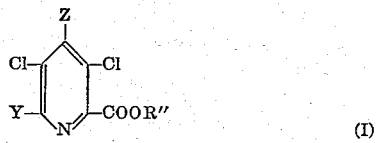

(I)

In this and succeeding formulas, Y is hydrogen or chlorine; Z is OR or SR' wherein in said OR, R is alkyl, lower alkenyl or aryl and in said SR', R' is alkyl or aryl; and R" is hydrogen, alkali metal, or lower alkyl. The expression "lower" when employed is intended to qualify the radical to indicate the carbon content of the radical to be up to about 4 carbon atoms. By "alkali metal" is meant sodium and potassium.

In the foregoing formula, OR is a residue of a hydroxy compound, ROH, while SR' is a residue of a thiol compound, R'SH.

By the expression "hydroxy compound" as herein employed is meant an appropriate alcohol or phenol supplying OR to Z in Formula I. When R in OR is alkyl or lower alkenyl, the contributing hydroxy compound is an alkanol or a lower alkenol, respectively. Suitable alkanols include methyl alcohol, ethyl alcohol, sec.-butyl alcohol, n-amyl alcohol, 3,7-dimethyloctanol-1, sec.-hexyl alcohol, nonyl alcohol, n-undecyl alcohol, 3-pentadecanol, tridecyl alcohol, n-pentadecyl alcohol, n-heptadecyl alcohol, 2,3-dimethylpentanol-3, sec.-amyl alcohol, 5-methylhexanol-1, methylnonyl carbinol, 2-ethylhexanol, 5-ethyl-2-nonanol and cetyl methylcarbinol and other alkanols containing from 1 to 18 carbon atoms, inclusive. Suitable lower alkenols include allyl alcohol, crotyl alcohol and 2-methylallyl alcohol.

When R in OR is aryl, the contributing hydroxy compound is a phenol. Suitable phenols include monocyclic phenols containing from 1 to 5 substituents on a phenyl ring selected from the group consisting of hydrogen, alkyl containing from 1 to 10 carbon atoms, inclusive, phenyl, chloro and nitro. Typical phenols include Phenol,
o-Ethylphenol,
m-Ethyl phenol,
4-methyl-5-ethylphenol,
2-methyl-4-ethylphenol,
p-Cresol,
3,5-dimethylphenol,
2,5-dimethylphenol,
2,4-diethylphenol,
3,5-diethylphenol,
Thymol,
Carvacrol,
p-Tert.-butylphenol,
m-Sec.-butylphenol,
p-Sec.-amylphenol,
p-n-Hexylphenol,
p-Tert.-octylphenol,
2,5-dimethyl-6-ethylphenol,
p-Decylphenol,
Pentachlorophenol,
2,4-dichlorophenol,
p-Chlorophenol,
p-Phenylphenol,
2-chloro-4-phenylphenol,
2,3,4-tri-chlorophenol,
2,3,5,6-tetrachlorophenol,
2,3,5,6-tetrachloro-o-cresol,
4-chloro-2-phenylphenol,
p-Nitrophenol,
2-nitro-p-cresol,
2-chloro-4-nitrophenol,
6-chlorothymol,
p-Chloro-m-xylenol,
p-Isopropylphenol,
Nitro-tert.-butyl-o-cresol,
2,4-dinitro-6-sec.-butylphenol,
4,6-dichloro-o-cresol,
2,4-dinitro-6-isopropylphenol,
2,4-dinitro-6-hexylphenol,
2,4-dinitro-6-phenylphenol,
2,4-dichloro-symmetrical-m-xylenol,
2,5-diisopropylphenol,
3,5-dinitrophenol,
2,3,5,6-tetramethylphenol,
2,4,6-trichloro-m-cresol and
2,3,5-trimethylphenol.

By the expression "thiol compound" as herein employed is meant an appropriate mercaptan or thiophenol supplying SR' to Z in Formula I. Suitable mercaptans are those containing from 1 to 8 carbon atoms, inclusive, and include n-octyl mercaptan, n-heptyl mercaptan, n-hexyl mercaptan, ethyl mercaptan, n-propyl mercaptan, methyl mercaptan and butyl mercaptan.

Suitable thiophenols include monocyclic thiophenols containing from 1 to 5 substituents on a phenyl ring selected from the group consisting of hydrogen, alkyl containing from 1 to 4 carbon atoms, inclusive, phenyl, chloro and nitro. Typical thiophenols include Benzenethiol (thiophenol),
p-Tert.-butylbenzenethiol,
2,6-diethylbenzenethiol,
2,4,6-triisopropylbenzenethiol,
2,4,6-trinitrobenzenethiol,
2,4,6-trimethylbenzenethiol,
4,-biphenylthiol,
2,4,5-trichlorobenzenethiol,
Pentachlorobenzenethiol,
p-Nitrobenzenethiol,
2-chlorobenzenethiol,
2,4,-dichlorobenzenethiol,
m-Toluenethiol,
3,4-dichlorobenzenethiol,
2,5-dichlorobenzenethiol,
2,4-dinitrobenzenethiol and
2-ethylbenzenethiol.

The products of the present invention are generally white crystalline solids or oily liquids, soluble in many organic solvents such as carbon tetrachloride, perchloroethylene, chloroform, diethyl ether, ethyl alcohol, isopropyl alcohol and substantially insoluble in water.

The products of the present invention are useful in numerous agricultural operations. They are useful in agronomical practice for the control of weeds and weed seeds. They are also useful as parasiticides and are adapted to be employed as toxic constituents of nematocide, miticide, insecticide, and anthelmintic compositions.

The ether polychloropicolinic acid compounds of the present invention may be prepared by one or more methods. The preferred method or methods depend on the nature of Z and of R" in Formula I.

The oxygen ether or O-ether polychloropicolinic acid compounds may be represented by Formula II

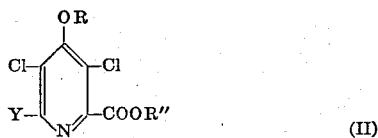
(II)

The methyl esters of O-ether polychloropicolinic acid compounds, those in which R″ in Formula II is methyl and the other substituents are as previously set forth, may be prepared by stirring together an appropriate O-ether (trichloromethyl)pyridine compound represented by Formula III

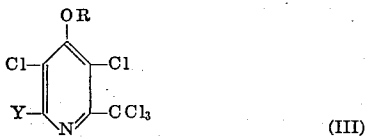
(III)

with moist methanol whereupon a reaction takes place with the formation of the methyl ester of the polychloropicolinic acid compound and silver chloride and nitric acid by-products. In the present application the α-trichloromethyl group has been designated as being in the 2-position although it is recognized that under alternative nomenclature it may often be designated as being in the 6-position.

In the preparation of the methyl esters, the appropriate (trichloromethyl)pyridine compounds, silver nitrate and moist methanol are stirred together and the resulting mixture heated at the reflux temperature of the mixture for time sufficient for substantial completion of the reaction and the formation of the methyl ester of the polychloropicolinic acid product and silver chloride by-product. Both silver nitrate and methanol are employed in excess on a molar basis. About three- to five-fold molar excess of silver nitrate is considered desirable. Methanol functions as a solvent as well as a reactant, hence a large excess is generally employed. The methanol employed generally contains some water. The reaction is allowed to take place over a period of from about 1 hour to about 8 hours or more. After completion of the heating, hydrochloric acid is added to the reaction mixture to precipitate the unreacted silver nitrate as silver chloride. The resulting mixture is filtered to remove the silver chloride and the filtrate added to water to precipitate the methyl ester as an oil. The aqueous mixture is extracted with a water-immiscible solvent such as benzene to recover the ester and the solvent extract vaporized to remove the solvent and to obtain the ester as residue. The ester may be purified, if desired, by conventional procedures such as washing, distilling or recrystallizing. Esters which are solids may be recrystallized from solvents such as benzene, hexane, pentane and mixtures thereof.

In a preferred method for carrying out the reaction for the preparation of the methyl ester, the appropriate (trichloromethyl)pyridine compound, about four-fold molar excess of silver nitrate and about ten-fold molar excess of moist methanol are mixed together and heated at reflux temperature for about 2 to 3 hours whereupon a reaction takes place with the formation of the methyl ester of the picolinic acid compound and silver chloride by-product, the latter precipitating in the reaction mixture. The reaction mixture is cooled and hydrochloric acid added thereto to precipitate the excess silver nitrate as silver chloride. The mixture is filtered to remove the silver chloride, the filtrate diluted with water and extracted with benzene. The benzene extract is subjected to reduced pressure and/or heat to vaporize off the solvent and to recover the methyl ester of the polychloropicolinic acid as residue. The ester may be purified, if desired, as previously described or employed in the preparation of the alkali metal salt or acid as hereinafter described.

The alkali metal salts of O-ether polychloropicolinic acids, i.e., compounds wherein R″ in Formula II is sodium or potassium, may be prepared by mixing and heating together the appropriate methyl ester, prepared as above described, with aqueous or alcoholic alkali.

In the preparation of the alkali metal salts by this method, the appropriate methyl ester is mixed together with aqueous or alcoholic alkali and stirred in the temperature range of from about 25° to about 100° C. The aqueous or alcoholic alkali employed may vary in concentration from about 1 percent to about 25 percent alkali. The reaction takes place in from about 1 to 5 hours with the formation of the desired alkali metal salt of O-ether polychloropicolinic acid. The salt product is generally soluble in the reaction medium and may be recovered therefrom by vaporizing off the solvent. The salt may be purified by washing with a small amount of water. An alternative method is discussed following the discussion of the preparation of the acid.

The O-ether polychloropicolinic acids, i.e., compounds wherein R″ in Formula II is hydrogen, may be prepared by mixing together an aqueous or aqueous alcoholic solution of an alkali metal salt of the appropriate O-ether polychloropicolinic acid, i.e., a compound wherein R″ in Formula II is alkali metal, with a mineral acid.

In the preparation of the O-ether polychloropicolinic acid, an aqueous alcoholic alkaline solution resulting from alkaline hydrolysis of the methyl ester of the appropriate acid as above described, or an aqueous solution of an appropriate alkali metal salt prepared as above described, is made acid with dilute acid whereupon the desired picolinic acid precipitates in the reaction medium. Suitable acids include the conventional mineral acids such as hydrochloric acid or sulfuric acid. The acid product may be recovered by filtration or by the vaporization of the solvent. The acid product thus obtained is generally of high purity but may be further purified, if desired, by washing or by recrystallization from a suitable solvent, such as acetone or ethanol.

When the acid has previously been prepared, the alkali metal salts may be prepared by mixing together and reacting the appropriate O-ether polychloropicolinic acid and sodium or potassium metal hydroxide.

In carrying out the reaction, substantially equivalent proportions of the acid and base are mixed together in a suitable medium such as an alcoholic or aqueous alcoholic medium, generally with warming such as on a steam bath, and thereafter vaporizing off the water and alcohol to recover the desired sodium or potassium O-ether polychloropicolinate salt. If desired, the salt may be purified by conventional procedures.

The lower alkyl esters of O-ether polychloropicolinic acid compounds, those in which R″ in Formula II is lower alkyl may be prepared by mixing together and reacting the appropriate O-ether acid, prepared as above described, with silver nitrate in aqueous ammonia or moist silver oxide to produce an intermediate silver salt, i.e., a compound in which R″ in Formula II is silver, and thereafter stirring together and causing to react the silver salt with a lower alkyl halide.

In the preparation of the lower alkyl esters of O-ether polychloropicolinic acid compounds, the appropriate O-ether acid and silver nitrate in aqueous ammonia or moist silver oxide are stirred together whereupon a reaction takes place with the formation of the desired silver salt of O-ether polychloropicolinic acid which precipitates in the reaction mixture. In carrying out this step, substantially equimolar proportions of the reactants are employed. The silver salt is recovered by filtration and purified, if desired, by washing with dilute ethanol or methanol. The silver salt is then mixed with substantially equimolar proportions of an appropriate lower alkyl halide, such as alkyl bromide or iodide, in a diluent such as xylene or benzene and the resulting mixture heated at the reflux temperature of the reaction mixture for time sufficient to complete the reaction. The reaction is usually complete in from about 2 to 6 hours with the formation of the desired lower alkyl ester of O-ether polychloropicolinic acid compound and silver halide by-product which precipitates in the reaction mixture. The by-product is removed by filtration and the filtrate subjected to distillation to remove the solvent and recover the desired ester product as residue.

Lower alkyl esters of O-ether polychloropicolinic acid compounds in which the ester alkyl and the ether alkyl are both the same lower alkyl, namely, esters which may be represented by the Formula IV

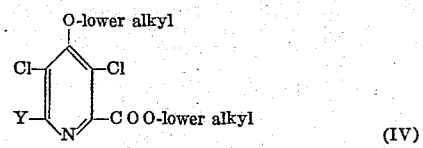

(IV)

may be prepared by an alternative method of mixing and heating together a (trichloromethyl)pyridine compound, having a structure as set forth in Formula III wherein R is lower alkyl, with lower alkanol and silver nitrate in the presence of water. The lower alkyl group in the (trichloromethyl)pyridine compound, i.e., R in Formula III, and the alkyl group in the lower alkanol may be same or different. If they are the same, the expected product is obtained having the same alkyl group at the ester and ether positions. If the R in Formula III is different from the alkyl group in the alkanol, there appears to be an exchange at the ether position so that the primary product resulting from the reaction is one in which the alkyl groups correspond to the alkyl group of the alkanol employed.

In carrying out this reaction, the appropriate (trichloromethyl)pyridine compound is heated with a substantial molar excess of lower alkanol and silver nitrate, preferably at the reflux temperature for from about 2 to 8 hours whereupon a reaction takes place with the formation of the desired O-ether product and silver chloride and nitric acid by-products. After completion of the heating, hydrochloric acid is added to the reaction mixture to precipitate the unreacted silver nitrate as silver chloride, followed immediately by the addition of a water-immiscible organic solvent such as methylene dichloride to preferentially dissolve the ester product and remove it from the acid environment. The resulting mixture is filtered to remove the solid silver chloride and the immiscible organic-aqueous filtrate separated by appropriate procedures such as by decantation. The organic solution is then dried and distilled to recover the desired O-ether polychloropicolinate ester product as residue. The ester product may be purified, if desired, by conventional procedures such as recrystallizing, washing or distilling.

The thio ether or S-ether polychloropicolinic acid compounds may be represented by Formula V

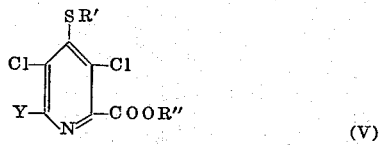

(V)

The S-ether polychloropicolinic acid compounds which are acids, i.e., R″ in Formula V is hydrogen, may be prepared by heating an appropriate S-ether (trichloromethyl)pyridine compound represented by the Formula VI

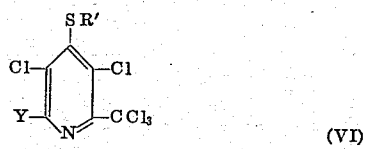

(VI)

in aqueous acid to obtain the desired S-ether polychloropicolinic acid and hydrogen chloride by-product. Suitable strong acids for carrying out the hydrolysis include 50 to 80 percent aqueous sulfuric acid and concentrated phosphoric acid. The reaction is carried out in the temperature range of from about 80° C. to about 180° C. for a period of from about 0.25 to about 2 hours. During the heating a reaction takes place with the formation of the desired S-ether polychloropicolinic acid and hydrogen chloride by-product which evolves from the reaction mixture.

In carrying out the reaction, the appropriate S-ether (trichloromethyl)pyridine compound as identified in Formula VI is mixed with aqueous acid and the resulting mixture heated initially to from about 80° C. to 145° C. whereupon a reaction starts to take place with a vigorous evolution of hydrogen chloride by-product from the reaction mixture. Depending on the intensity of gas evolution, external heating may be temporarily removed until the intensity diminishes, then heating may be continued in the temperature range of from about 140° C. to about 160° C. and maintained in this range for about 0.25 to 2 hours. At the end of this period, the reaction mixture is allowed to cool to room temperature and then added to a large volume of water or ice-water mixture to precipitate the desired S-ether polychloropicolinic acid. The latter is recovered by filtration and may be purified, if desired, by conventional procedures.

The S-ether polychloropicolinic acid compounds which are alkali metal salts, i.e., compounds wherein R″ in Formula V is sodium or potassium, may be prepared by the reaction of the appropriate S-ether polychloropicolinic acid and aqueous alkali.

In carrying out the reaction, substantially equimolar proportions of the appropriate S-ether acid and alkali metal hydroxide are mixed together in a suitable medium such as an aqueous alcoholic medium, generally with warming such as on a steam bath, and thereafter vaporizing off the solvent and water to recover the desired sodium or potassium S-ether polychloropicolinate product. The salt may be purified, if desired, by conventional methods.

The S-ether polychloropicolinic acid compounds which are esters, i.e., compounds wherein R″ in Formula V is lower alkyl, may be prepared by direct esterification of the appropriate S-ether polychloropicolinic acid with the appropriate alkanol in the presence of an acid catalyst.

In carrying out the reaction, the appropriate S-ether acid and excess lower alkanol are heated together at reflux temperature in the presence of a small amount of sulfuric acid or hydrogen chloride whereupon a reaction takes place with the formation of the desired ester product and water by-product chloride. The amount of catalyst is generally from about 1 to 5 percent of the weight of alcohol used. The product may be isolated by distilling off most of the alcohol, pouring the residue into water, neutralizing it by the addition of sodium carbonate solution, separating the ester from the aqueous layer, and drying the ester. The ester may be further purified, if desired, by distillation or other conventional procedures.

The following examples illustrate the invention but are not to be construed as limiting:

*Example 1.—Methyl 3,5-dichloro-4-ethoxypicolinate*

10.0 grams (0.032 mole) of 3,5-dichloro-4-ethoxy-2-(trichloromethyl)pyridine (M.P. 52°–53° C.) and 22 grams (0.13 mole) of silver nitrate were mixed together in 200 milliliters of methanol and the mixture heated at reflux temperature for 2.6 hours to produce a methyl 3,5-dichloro-4-ethoxypicolinate product and silver chloride and nitric acid by-products in the reaction mixture. Hydrochloric acid was added to the reaction mixture to precipitate unreacted silver nitrate as silver chloride. The mixture was filtered to remove the silver chloride and the filtrate added to water whereupon the desired methyl 3,5-dichloro-4-ethoxypicolinate product precipitated as an oil. The aqueous mixture was extracted with benzene to recover the product and the benzene extract distilled to vaporize off the benzene to recover the ester as residue. The ester was then recrystallized from a benzene-hexane mixture to obtain 5.0 grams of a purified methyl 3,5-dichloro-4-ethoxypicolinate product as a white solid melting from 44° to 50° C.

*Example 2.—3,5-dichloro-4-ethoxypicolinic acid*

2.3 grams (0.0092 mole) of methyl 3,5-dichloro-4-ethoxypicolinate prepared as described in Example I was mixed and stirred with 30 milliliters of 3 percent sodium hydroxide solution for three hours at temperatures of from about 40° to 50° C. whereupon a homogeneous solution of sodium 3,5-dichloro-4-ethoxypicolinate was obtained. Sodium 3,5-dichloro-4-ethoxypicolinate has a molecular weight of 258. The solution was acidified with hydrochloric acid to obtain as precipitate 2.0 grams of 3,5-dichloro-4-ethoxypicolinic acid having a melting point of 137°–138° C.

*Example 3.—Methyl 3,5-dichloro-4-(p-chlorophenoxy)-picolinate*

In a manner similar to that described in Example 1, 4.75 grams (0.012 mole) of 3,5-dichloro-4-(p-chlorophenoxy)-2-(trichloromethyl)pyridine, 8.2 grams (0.048 mole) of silver nitrate and 54 milliliters of methanol were mixed together and heated at the reflux temperature of the mixture for about 2.75 hours to obtain an orange solution and a white precipitate with the formation of a methyl 3,5-dichloro-4-(p-chlorophenoxy)picolinate product and silver chloride and nitric acid by-products. Hydrochloric acid was added to the resulting mixture to precipitate the unreacted silver nitrate as silver chloride. Sodium bicarbonate was then added to the resulting mixture to neutralize the acid. Thereafter, the mixture was filtered to remove the precipitate and the filtrate distilled to remove the solid and to recover the crude methyl 3,5-dichloro-4-(p-chlorophenoxy)picolinate product as residue. The crude product was washed with water and recrystallized from hexane to obtain a purified product as a white solid having a melting point of 98.5°–99.5° C. The product had elemental analyses as follows:

Theory: carbon 47.0, hydrogen 2.4, chlorine 32.2, nitrogen 4.2. Found: carbon 46.83, hydrogen 2.28, chlorine 32.18, nitrogen 4.00.

*Example 4*

In a manner similar to that described in Example 1, the following esters are prepared:

Methyl 3,5-dichloro-4-methoxypicolinate melting from 42° to 48° C. by the reaction of 3,5-dichloro-4-methoxy-2-(trichloromethyl)-pyridine, methanol and silver nitrate.

Methyl 3,5,6-trichloro-4-methoxypicolinate having a melting point of 98°–100° C. by the reaction of 3,5,6-trichloro-4-methoxy-2-(trichloromethyl)pyridine, methanol and silver nitrate.

Methyl 3,5,6-trichloro-4-ethoxypicolinate having a molecular weight of 284.5 by the reaction of 3,5,6-trichloro-4-ethoxy-2-(trichloromethyl)pyridine, methanol and silver nitrate.

Methyl 4-(n-butoxy)-3,5,6-trichloropicolinate having a molecular weight of 313.5 by the reaction of 4-(n-butoxy)-3,5,6-trichloro-2-(trichloromethyl)pyridine, methanol and silver nitrate.

Methyl 3,5,6-trichloro-4-isopropoxypicolinate having a molecular weight of 298.6 by the reaction of 3,5,6-trichloro-4-isopropoxy-2-(trichloromethyl)pyridine, methanol and silver nitrate.

Methyl 3,5-dichloro-4-isopropoxypicolinate having a molecular weight of 264 by the reaction of 3,5-dichloro-4-isopropoxy-2-(trichloromethyl)pyridine, methanol and silver nitrate.

Methyl 3,5-dichloro-4-(n-butoxy)picolinate having a molecular weight of 278 by the reaction of 3,5-dichloro-4-(n-butoxy)-2-(trichloromethyl) pyridine, methanol and silver nitrate.

Methyl 3,5-dichloro-4-(n-decyloxy)picolinate having a molecular weight of 362 by the reaction of 3,5-dichloro-4-(n-decyloxy)-2-(trichloromethyl)pyridine, methanol and silver nitrate.

Methyl 3,5-dichloro-4-(n-heptyloxy)picolinate having a molecular weight of 320 by the reaction of 3,5-dichloro-4-(n-heptyloxy)-2-(trichloromethyl)pyridine, methanol and silver nitrate.

Methyl 4-(4-sec.-butylphenoxy)-3,5-dichloropicolinate having a molecular weight of 354 by the reaction of 4-(4-sec.-butylphenoxy)-3,5-dichloro-2-(trichloromethyl)pyridine, methanol and silver nitrate.

Methyl 3,5,6-trichloro-4-(n-octadecyloxy)picolinate having a molecular weight of 509 by the reaction of 3,5,6-trichloro-4-(n-octadecyloxy)-2-(trichloromethyl)pyridine, methanol and silver nitrate.

Methyl 3,5-dichloro-4-(p-n-nonylphenoxy)picolinate having a molecular weight of 424 by the reaction of 3,5-dichloro-4-(p-n-nonylphenoxy)-2-(trichloromethyl) pyridine, methanol and silver nitrate.

Methyl 3,5-dichloro-4-(p-nitrophenoxy)picolinate having a molecular weight of 343 by the reaction of 3,5-dichloro-4-(p-nitrophenoxy)-2-(trichloromethyl)pyridine, methanol and silver nitrate.

Methyl 3,5,6-trichloro-4-(2,4-xylyloxy)picolinate having a molecular weight of 360.5 by the reaction of 3,5,6-trichloro-4-(2,4-xylyloxy)-2-(trichloromethyl)pyridine, methanol and silver nitrate.

Methyl 3,5-dichloro-4-(pentachlorophenoxy)picolinate having a molecular weight of 470.5 by the reaction of 3,5-dichloro(pentachlorophenoxy)-2-(trichloromethyl) pyridine, methanol and silver nitrate.

Methyl 3,5-dichloro-4-(2,4-dinitrophenoxy)picolinate having a molecular weight of 388.5 by the reaction of 3,5-dichloro-4-(2,4-dinitrophenoxy)-2-(trichloromethyl) pyridine, methanol and silver nitrate.

Methyl 4-allyloxy-3,5,6-trichloropicolinate having a molecular weight of 296.5 by the reaction of 4-allyloxy-3,5,6-trichloro-2-(trichloromethyl)pyridine, methanol and silver nitrate.

Methyl 4-crotyloxy-3,5,6-trichloropicolinate having a molecular weight of 310.5 by the reaction of 4-crotyloxy-3,5,6-trichloro-2-(trichloromethyl)pyridine, methanol and silver nitrate.

Methyl 3,5-dichloro-4-(2-phenylphenoxy)picolinate having a molecular weight of 374 by the reaction of 3,5-dichloro-4-(2-phenylphenoxy)-2-(trichloromethyl)pyridine, methanol and silver nitrate.

Methyl 3,5-dichloro-4-phenoxypicolinate having a molecular weight of 298 by the reaction of 3,5-dichloro-4-phenoxy-2-(trichloromethyl)pyridine, methanol and silver nitrate.

Methyl 3,5,6-trichloro-4-(2-chloro-4-phenylphenoxy)picolinate having a molecular weight of 442 by the reaction of 3,5,6-trichloro-4-(2-chloro-4-phenylphenoxy)-2-(trichloromethyl)pyridine, methanol and silver nitrate.

*Example 5*

In a manner similar to that described in Example 2 from a methyl ester prepared in a manner similar to that described in Example 1, the following acids are prepared:

3,5-dichloro-4-methoxypicolinic acid as white crystals having a melting point of 167° C. by the reaction of methyl 3,5-dichloro-4-methoxypicolinate and aqueous alkali to form sodium 3,5-dichloro-4-methoxypicolinate having a molecular weight of 244 followed by the reaction of hydrochloric acid with an aqueous solution of sodium 3,5-dichloro-4-methoxypicolinate.

3,5-dichloro-4-isopropoxypicolinic acid as light yellow crystals having a melting point of 122°–124° C. by the reaction of methyl 3,5-dichloro-4-isopropoxypicolinate and aqueous alkali to form sodium 3,5-dichloro-4-isopropoxypicolinate having a molecular weight of 272 followed by the reaction of hydrochloric acid with an aqueous solution of sodium 3,5-dichloro-4-isopropoxypicolinate.

3,5,6-trichloro-4-ethoxypicolinic acid as light cream-colored crystals melting from 83° to 87° C. by the reaction of methyl 3,5,6-trichloro-4-ethoxypicolinate and aqueous alkali to form sodium 3,5,6-trichloro-4-ethoxypicolinate having a molecular weight of 292.5 followed by the reaction of hydrochloric acid with an aqueous solution of sodium 3,5,6-trichloro-4-ethoxypicolinate.

3,5,6-trichloro-4-n-butoxypicolinic acid as a yellow-brown oil having a molecular weight of 299.6 by the reaction of methyl 3,5,6-trichloro-4-n-butoxypicolinate and aqueous alkali to form sodium 3,5,6-trichloro-4-n-butoxypicolinate having a molecular weight of 320.5 followed by the reaction of hydrochloric acid with an aqueous solution of sodium 3,5,6-trichloro-4-n-butoxypicolinate.

3,5,6-trichloro-4-methoxypicolinic acid as white crystals having a melting point of 168°–169° C. by the reaction of methyl 3,5,6-trichloro-4-methoxypicolinate and aqueous alkali to form sodium 3,5,6-trichloro-4-methoxypicolinate having a molecular weight of 278.4, followed by reaction of hydrochloric acid with an aqueous solution of sodium 3,5,6-trichloro-4-methoxypicolinate.

3,5,6-trichloro-4-isopropoxypicolinic acid as white crystals melting from 98° to 106° C. by the reaction of methyl 3,5,6-trichloro-4-isopropoxypicolinate and aqueous alkali to form sodium 3,5,6-trichloro-4-isopropoxypicolinate having a molecular weight of 306.5, followed by the reaction of hydrochloric acid with an aqueous solution of sodium 3,5,6-trichloro-4-isopropoxypicolinate.

4 - (n - butoxy) - 3,5 - dichloropicolinic acid as a light colored solid melting from 99° to 102° C. by the reaction of methyl 4-(n-butoxy)-3,5-dichloropicolinate and aqueous alkali to form sodium 4-(n-butoxy)-3,5-dichloropicolinate having a molecular weight of 285, followed by the reaction of hydrochloric acid with an aqueous solution of sodium 4-(n-butoxy)-3,5-dichloropicolinate.

3,5-dichloro-4-(p-chlorophenoxy)picolinic acid having a molecular weight of 284 by the reaction of methyl 3,5-dichloro-4-(p-chlorophenoxy)picolinate and aqueous alkali to form sodium 3,5-dichloro-4-(p-chlorophenoxy)picolinate having a molecular weight of 306, followed by the reaction of hydrochloric acid and sodium 3,5-dichloro-4-(p-chlorophenoxy)picolinate.

3,5,6 - trichloro-4-(2-chloro-4-phenylphenoxy)picolinic acid having a molecular weight of 429 by the reaction of methyl 3,5,6-trichloro-4-(2-chloro-4-phenylphenoxy)picolinate and aqueous alkali to form sodium 3,5,6-trichloro-4-(2-chloro-4-phenylphenoxy)picolinate having a molecular weight of 451, followed by the reaction of hydrochloric acid and sodium 3,5,6-trichloro-4-(2-chloro-4-phenylphenoxy)picolinate.

4-allyloxy-3,5-dichloropicolinic acid having a molecular weight of 248 by the reaction of methyl 4-allyloxy-3,5-dichloropicolinate and aqueous alkali to form sodium 4 - allyloxy - 3,5 - dichloropicolinate having a molecular weight of 270, followed by the reaction of hydrochloric acid and sodium 4-allyloxy-3,5-dichloropicolinate.

3,5 - dichloro-4-(2,4,5-trichlorophenoxy)picolinic acid having a molecular weight of 387.5 by the reaction of methyl 3,5-dichloro-4-(2,4,5-trichlorophenoxy)picolinate and aqueous alkali to form sodium 3,5-dichloro-4-(2,4,5-trichlorophenoxy)picolinate having a molecular weight of 409.5, followed by the reaction of hydrochloric acid and sodium 3,5-dichloro-4-(2,4,5-trichlorophenoxy)picolinate.

3,5-dichloro-4-(4-methyl-2-nitrophenoxy)picolinic acid having a molecular weight of 343 by the reaction of methyl 3,5 - dichloro - 4-(4-methyl-2-nitrophenoxy)picolinate and aqueous alkali to form sodium 3,5-dichloro-4-(4-methyl-2-nitrophenoxy)picolinate having a molecular weight of 365, followed by the reaction of hydrochloric acid and sodium 3,5 - dichloro - 4-(4-methyl-2-nitrophenoxy)picolinate.

3,5,6 - trichloro - 4-(n-octadecyloxy)picolinic acid having a molecular weight of 495 by the reaction of methyl 3,5,6-trichloro-(4-n-octadecyloxy)picolinate and aqueous alkali to form sodium 3,5,6-trichloro-(4-n-octadecyloxy)picolinate having a molecular weight of 517, followed by the reaction of sodium 3,5,6-trichloro-4-(n-octadecyloxy)picolinate and hydrochloric acid.

3,5 - dichloro - 4 - (n-decyloxy)picolinic acid having a molecular weight of 348 by the reaction of methyl 3,5-dichloro-4-(n-decyloxy)picolinate and aqueous alkali to form sodium 3,5-dichloro-4-(n-decyloxy)picolinate having a molecular weight of 370, followed by the reaction of sodium 3,5-dichloro-4-(n-decyloxy)picolinate and hydrochloric acid.

*Example 6.—n-Butyl 3,5-dichloro-4-(n-butoxy)picolinate*

5.9 grams (0.02 mole) of 3,5-dichloro-4-methoxy-2-(trichloromethyl)pyridine, 13.6 grams (0.08 mole) of silver nitrate, 60 milliliters of n-butanol and 11 milliliters of water were stirred together and heated at reflux temperature for 5.5 hours whereupon a reaction took place with the formation of the desired alkoxy ester product and silver chloride and nitric acid by-products. Dilute aqueous hydrochloric acid was added to the reaction mixture to precipitate unreacted silver nitrate. Immediately thereafter, methylene dichloride was added to the resulting mixture to preferentially dissolve the alkoxy ester in the organic solvent and remove it from the acid atmosphere. The mixture was then filtered to remove the silver chloride and the filtrate decanted to separate the organic and aqueous layers. The organic solution was dried and the solvent distilled off by distilling under aspirator pressure to recover crude ester product as residue. The crude product was dissolved in hexane and filtered hot to remove undissolved solid and the hexane vaporized off to recover a n-butyl 3,5,-dichloro-4-(n-butoxy)picolinate monohydrate product as a yellow oil. The structure of the product was confirmed by infra-red spectral analysis. The monohydrate product had elemental analyses as follows:

Theory: chlorine 21.0, nitrogen 4.14. Found: chlorine 20.92, nitrogen 4.12.

*Example 7.—Ethyl 3,5-dichloro-4-methoxypicolinate*

1.9 grams (0.01 mole) of 3,5-dichloro-4-methoxypicolinic acid and 1.7 grams (0.01 mole) of silver nitrate are stirred together in 10 milliliters of 1 N aqueous ammonia (0.01 mole) whereupon a reaction takes place with the formation of a silver salt of 3,5-dichloro-4-methoxypicolinic acid which precipitates in the reaction mixture. The mixture is filtered and the precipitate washed with water and ethanol to obtain an intermediate silver 3,5-dichloro-4-methoxypicolinate.

The silver 3,5-dichloro-4-methoxypicolinate thus obtained is stirred together with 3.12 grams (0.02 mole) of ethyl iodide and 5 milliliters of dry benzene with cooling. A reaction takes place immediately with evolution of heat. After the initial reaction subsides, the mixture is heated at reflux temperature for about 2 hours to obtain an ethyl 3,5-dichloro-4-methoxypicolinate product and silver iodide by-product. The reaction mixture is filtered to remove the silver iodide, the benzene filtrate washed with water, dried, and then distilled to vaporize off the solvent and recover as residue an ethyl 3,5-dichloro-4-methoxypicolinate product having a molecular weight of 250.

*Example 8*

In a manner similar to that described in Example 7, the following esters are prepared:

n-Propyl 3,5,6-trichloro-4-(n-heptadecyloxy)picolinate having a molecular weight of 523 by the reaction of 3,5,6-trichloro-4-(n-heptadecyloxy)picolinic acid and silver nitrate in aqueous ammonia to produce an intermediate silver 3,5,6 - trichloro-4-(n-heptadecyloxy)picolinate, followed by the reaction of the latter with n-propyl iodide.

n-Butyl 3,5-dichloro-4-(p-phenylphenoxy)picolinate having a molecular weight of 416.3 by the reaction of 3,5-dichloro-4-(p-phenylphenoxy)picolinic acid and silver nitrate in aqueous ammonia, to produce an intermediate silver 3,5-dichloro-4-(p-phenylphenoxy)picolinate, followed by the reaction of the latter with n-butyl bromide.

Ethyl 3,5-dichloro-4-(2,4-dichlorophenoxy)picolinate having a molecular weight of 381 by the reaction of 3,5-dichloro-4-(2,4-dichlorophenoxy)picolinic acid and silver nitrate in aqueous ammonia to produce the intermediate silver 3,5-dichloro-4-(2,4-dichlorophenyl)picolinate, followed by the reaction of the latter with ethyl iodide.

*Example 9.—3, 5-dichloro-4-(methylthio)picolinic acid*

12.4 grams (0.4 mole) of 3,5-dichloro-4-methylthio-2-(trichloromethyl)pyridine and 37 milliliters of 80 percent sulfuric acid were mixed together and heated in the temperature range of from about 145° to about 148° C. for about 1.5 hours whereupon a reaction took place with the formation of the desired 3,5-dichloro-4-(methylthio) picolinic acid product and hydrogen chloride by-product which evolved from the reaction mixture. After the heating was completed, the mixture was poured over ice to precipitate the product. The latter was recovered by filtration washed and dried. The product had a melting point of 146°–147° C. The product had a nitrogen content of 5.89 percent and a sulfur content of 13.41 percent. The theoretical values are 5.88 percent and 13.5 percent, respectively.

*Example 10*

In a manner similar to that described in Example 9, the following compounds are prepared:

4-(n-butylthio)-3,5-dichloropicolinic acid having a molecular weight of 280 by the reaction of 4-(n-butylthio)-3,5-dichloro-2-(trichloromethyl)pyridine and sulfuric acid.

3,5-dichloro-4-(n-octylthio)picolinic acid having a molecular weight of 336 by the reaction of 3,5-dichloro-4-(n-octylthio)-2-(trichloromethyl)pyridine and sulfuric acid.

3,5,6-trichloro-4-(phenylthio)picolinic acid having a molecular weight of 334.6 by the reaction of 3,5,6-trichlo-4-phenylthio-2-(trichloromethyl)pyridine and sulfuric acid.

3,5,6-trichloro-4-(4-nitrophenylthio)picolinic acid having a molecular weight of 379.6 by the reaction of 3,5,6-trichloro-4-(4-nitrophenylthio)-2-(trichloromethyl)pyridine and sulfuric acid.

3,5 dichloro-4-(4-chlorophenylthio)picolinic acid having a molecular weight of 334.6 by the reaction of 3,5-dichloro-4-(4-chlorophenylthio)-2-(trichloromethyl)pyridine and sulfuric acid.

3,5-dichloro-4-(2,4,6-trimethylphenylthio)picolinic acid having a molecular weight of 342 by the reaction of 3,5-dichloro-4-(2,4,6-trimethylphenylthio)-2-(trichloromethyl)pyridine and sulfuric acid.

3,5,6-trichloro-4-(4-phenylphenylthio)picolinic acid having a molecular weight of 410.7 by the reaction of 3,5,6-trichloro-4-(4-phenylphenylthio)-2-(trichloromethyl)pyridine and sulfuric acid.

3,5,6-trichloro-4-(tert.-butylphenylthio)picolinic acid having a molecular weight of 390.7 by the reaction of 3,5,6-trichloro-4-(tert.-butylphenylthio)-2-(trichloromethyl)pyridine and sulfuric acid.

3,5-dichloro-4-(pentachlorophenylthio)picolinic acid having a molecular weight of 472.4 by the reaction of 3,5-dichloro-4-(pentachlorophenylthio)-2-(trichloromethyl) pyridine and sulfuric acid.

3,5,6-trichloro-4-(2,4-dinitrophenylthio)picolinic acid having a molecular weight of 424.6 by the reaction of 3,5,6-trichloro-4-(2,4-dinitrophenylthio)-2-(trichloromethyl)pyridine and sulfuric acid.

*Example 11.—Methyl 3,5-dichloro-4-(methylthio) picolinate*

23.8 grams (0.1 mole) of 3,5-dichloro-4-(methylthio) picolinic acid and 150 milliliters of methanol and 5 milliliters of 12 N hydrochloric acid are mixed together and heated at reflux temperature for about 1.5 hours to obtain the desired ester product and water by-product. The excess methanol and water are then distilled off to recover as residue the desired methyl 3,5-dichloro-4-(methylthio) picolinate product having a molecular weight of 252.

*Example 12*

Normal butyl 4-(n-butylthio)-3,5-dichloropicolinate having a molecular weight of 336 by the reaction of 4-(n-butylthio)-3,5-dichloro-picolinic acid and n-butanol in the presence of hydrochloric acid.

Ethyl 3,5,6-trichloro-4-(phenylthio)picolinate having a molecular weight of 362.7 by the reaction of 3,5,6-trichloro-4-(phenylthio)picolinic acid and ethanol in the presence of hydrochloric acid.

Methyl 3,5,-dichloro-4-(4-chlorophenylthio)picolinate having a molecular weight of 348.6 by the reaction of 3,5-dichloro-4-(4-chlorophenylthio)picolinic acid and methanol in the presence of hydrochloric acid.

Isopropyl 3,5,6-trichloro-4-(4-phenylphenylthio)picolinate having a malecular weight of 453.6 by the reaction of 3,5,6-trichloro-4-(4-phenylphenylthio)picolinic acid and isopropanol in the presence of hydrochloric acid.

Ethyl 3,5,6-trichloro-4-(2,4-dinitrophenylthio)picolinate having a molecular weight of 452.6 by the reaction of 3,5,6-trichloro-4-(2,4-dinitrophenylthio)picolinic acid and ethanol in the presence of hydrochloric acid.

Methyl 3,5-dichloro-4-(n-octylthio)picolinate having a molecular weight of 350 by the reaction of 3,5-dichloro-4-(n-octylthio)picolinic acid and methanol in the presence of hydrochloric acid.

Methyl 3,5-dichloro-4- 2,4,6-trimethylphenylthio)picolinate having a molecular weight of 356 by the reaction of 3,5-dichloro-4-(2,4,6-trimethylphenylthio)picolinic acid and methanol in the presence of hydrochloric acid.

*Example 13*

The sodium and potassium salts of O-ether and S-ether picolinic acids are prepared by mixing together the appropriate O-ether or S-ether polychloropicolinic acid, prepared in the manner previously described, and sodium or potassium hydroxide in substantially equimolar proportions, generally, in alcoholic medium and thereafter evaporating to dryness:

Potassium 3,5-dichloro-4-(4-methyl-2-nitrophenoxy)picolinate, M.W. 381;

Potassium 3,5,6-trichloro-4-(2-chloro-4-phenylphenoxy) picolinate, M.W. 467;

Potassium 3,5-dichloro-4-n-butoxy-picolinate, M.W. 301;

Potassium 3,5-dichloro-3-methylthiopicolinate, M.W. 276;

Potassium 3,5,6-trichloro-4-phenylthiopicolinate, M.W. 373.7;

Potassium 3,5,6-trichloro-4-(2-,4-dinitrophenylthio)picolinate, M.W. 462.7;

Potassium 3,5-dichloro-4-(n-octylthio)picolinate, M.W. 374;

Sodium 4-(n-butylthio)-3,5-dichloropicolinate, M.W. 302;

Sodium 3,5-dichloro-4-(4-chlorophenylthio)picolinate, M.W. 356.6;

Sodium 3,5,6-trichloro-4-(4-phenylphenylthio)picolinate, M.W. 432.7;

Sodium 3,5-dichloro-4-(2-chloro-4-nitrophenylthio)picolinate, M.W. 401.6.

The products of the present invention are useful as pesticides and are adapted to be employed in various agricultural operations. They are particularly useful as enthelmintics for the control of parasites infesting warm-blooded animals. Thus, both the O-ether and S-ether compounds are useful for the control of ascarids, tapeworms, trichostrongylids and pin worms. They are also useful in agronomical practices, particularly as herbicides for the control of weeds and weed seeds. Many compounds are also useful as nitrification inhibitors. A number of the compounds are useful for the control of plant infesting pests such as nematodes, mites, aphids and insects. Certain of the compounds are adapted to be employed for the control of trash fish.

The usefulness of the compounds as anthelmintics may be seen from the following representative procedures. In separate operations, 3,5-dichloro-4-ethoxypicolinic acid, and 3,5,6-trichloro-4-isopropoxypicolinic acid were incorporated into feed to provide a concentration therein of one of the compounds of 600 parts by weight per million parts by weight of feed. Mice were fed the foregoing diet for 24 hours and then inoculated with *Ascaris ova* (pig ascarids) and the feeding continued for about one week. The mice were then sacrificed to determine the extent of control of the ascarids by comparing with control animals fed unmedicated diets. It was found that there was complete control of the helminths in all cases.

The usefulness of the compounds as herbicides may be seen in the following representative procedures. In separate operations, aqueous compositions containing one of 3,5-dichloro-4-ethoxypicolinic acid, 3,5-dichloro-4-methoxypicolinic acid, 3,5-dichloro-4-isopropoxypicolinic acid and methyl 3,5-dichloro-4-methoxypicolinate were found to give complete controls of vegetation when applied at a dosage of 50 pounds per acre to soil planted with peas and radish seeds.

Representative of usefulness as plant pest control agents is seen in operations where the compounds of the present invention are employed for the control of plant infesting two-spotted spider mites. In such operations, good controls are obtained when the infested plants are dipped or sprayed in separate operations with an aqueous dispersion containing as toxic ingredient 500 parts by weight of one of 3,5-dichloro-4-ethoxypicolinic acid, 3,5,6-trichloro-4-ethoxypicolinic acid and 3,5,6-trichloro-4-methoxypicolinic acid in a million parts of aqueous dispersion.

The O-ether (trichloromethyl)pyridine compounds (Formula III) and S-ether (trichloromethyl)pyridine compounds (Formula VI) which are starting materials for the preparation of the compounds of the present invention may be prepared by stirring together and heating a (trichloromethyl)pyridine compound having the structure

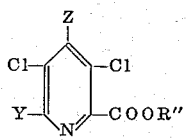

(VII)

with sodium salt of the appropriate hydroxy compound, RONa, or thiol compound, R'SNa, in a solvent such as alcohol at temperatures of from about 60° to about 120° C. for from about 0.5 to about 10 hours, and thereafter adding the resulting reaction mixture to ice water to precipitate the desired O-ether or S-ether (trichloromethyl) pyridine compound. The compound may be recovered by filtration or extracted from the aqueous mixture with a water-immiscible organic solvent, the organic solution distilled to remove the solvent and the desired O-ether or S-ether (trichloromethyl)pyridine compound recovered as residue. The compound may be purified, if desired, by conventional procedures.

The (trichloromethyl)pyridine compound (Formula VII above) may be prepared by contacting α-picoline and hydrogen chloride at temperatures of about 50° C. to produce a liquid α-picoline hydrochloride composition, thereafter, passing chlorine gas through the liquid mixture at temperatures of from about 95° to about 110° C. while irradiating the reaction mixture and thereafter fractionally distilling the liquid mixture.

The preferred compounds of the present invention may be represented by a formula selected from the group consisting of

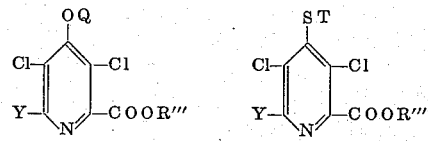

wherein R''' is hydrogen, lower alkyl or alkali metal, Q is lower alkyl, phenyl, monochlorophenyl, polychlorophenyl, lower alkylphenyl, phenylphenyl and phenylchlorophenyl, and T is lower alkyl.

I claim:
1. An ether polychloropicolinic acid compound having the formula

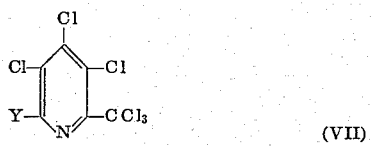

wherein Y is selected from the group consisting of hydrogen and chlorine; Z is selected from the group consisting of OR and SR', wherein said OR, R is selected from the group consisting of (a) alkyl containing from 1 to 18 carbon atoms, inclusive, (b) aryl wherein said aryl is selected from the group consisting of phenyl and substituted phenyl containing from 1 to 5 substituents, inclusive, wherein the substituent is selected from the group consisting of alkyl containing from 1 to 10 carbon atoms, inclusive, phenyl, chloro and nitro and (c) lower alkenyl; wherein in said SR', R' is selected from the group consisting of (a) alkyl containing from 1 to 8 carbon atoms, inclusive, and (b) aryl, wherein said aryl is selected from the group consisting of phenyl and substituted phenyl containing from 1 to 5 substituents, inclusive, wherein the substituent is selected from the group consisting of alkyl containing from 1 to 4 carbon atoms, inclusive, phenyl chloro and nitro; and R'' is selected from the group consisting of hydrogen, alkali metal and lower alkyl.
2. 3,5-dichloro-4-ethoxypicolinic acid.
3. Methyl 3,5-dichloro-4-methoxypicolinate.
4. 3,5-dichloro-4-methoxypicolinic acid.
5. Methyl 3,5-dichloro-4-ethoxypicolinate.
6. 3,5-dichloro-4-isopropoxypicolinic acid.
7. 3,5-dichloro-4-(normal-butoxy)picolinic acid.

References Cited by the Examiner

Beilstein, "Handbuch der Organischen Chemie," Heterocyclishe Reihe, Springer, 1935, p. 37.

WALTER A. MODANCE, *Primary Examiner.*
A. L. ROTMAN, *Assistant Examiner.*